US008331924B1

(12) United States Patent
Nolen

(10) Patent No.: US 8,331,924 B1
(45) Date of Patent: Dec. 11, 2012

(54) PHONE CALL BY PICTURE SELECTION

(75) Inventor: Larry P. Nolen, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 1308 days.

(21) Appl. No.: 11/773,209

(22) Filed: Jul. 3, 2007

(51) Int. Cl.
*H04M 3/00* (2006.01)

(52) U.S. Cl. ........ 455/420; 455/564; 455/566; 455/418; 345/172; 379/93.17; 379/93.23

(58) Field of Classification Search ............. 455/550.01, 455/551, 564, 420, 575.3, 566, 418, 405; 379/419–440, 355.01–357.05, 93.17, 93.23; 345/172; 715/780; 395/327, 977, 962
See application file for complete search history.

(56) References Cited

U.S. PATENT DOCUMENTS

| 5,687,331 | A  | * | 11/1997 | Volk et al. ..................... 715/840 |
| 6,084,951 | A  | * | 7/2000  | Smith et al. ................ 379/93.17 |
| 7,007,239 | B1 |   | 2/2006  | Hawkins et al. |
| 7,203,521 | B2 | * | 4/2007  | Lee et al. ....................... 455/564 |
| 2008/0146190 | A1 | * | 6/2008 | Kister ............................ 455/405 |

OTHER PUBLICATIONS

Internet Document: "myFaves Help for the Sidekick" at http://help.sidekick.dngr.com/en-us/T02037.html (accessed Mar. 22, 2007).

* cited by examiner

*Primary Examiner* — Kwasi Karikari
*Assistant Examiner* — Alexander Yi

(57) ABSTRACT

A wireless communication device is configured to respond to a call initiation instruction from a user with a two dimensional array of pictures or diagrams that each represent a potential call destination. The user can scroll (left, right, up, down) to select the image representing the desired call destination and upon selection from the user the wireless communication device places a call (voice or data) to the selected call destination or allows editing of the corresponding contact record. The pictures or diagrams presented to the user may be from a dynamic (e.g., most frequent contacts) or persistent (e.g., My favorites) predetermined list.

15 Claims, 2 Drawing Sheets

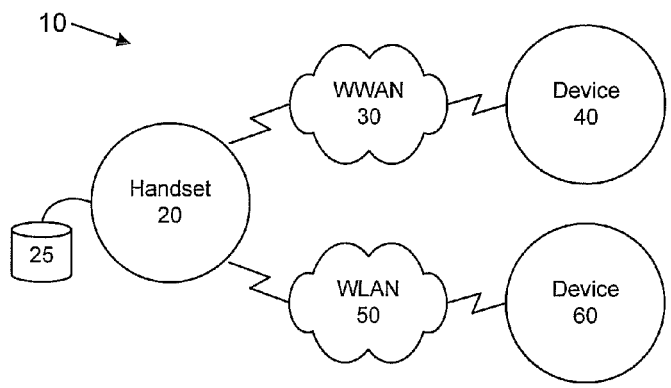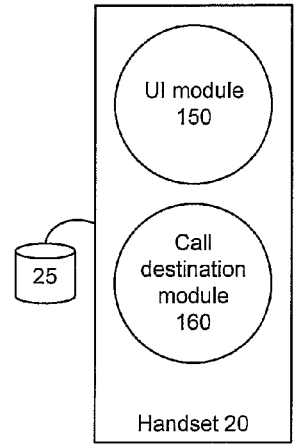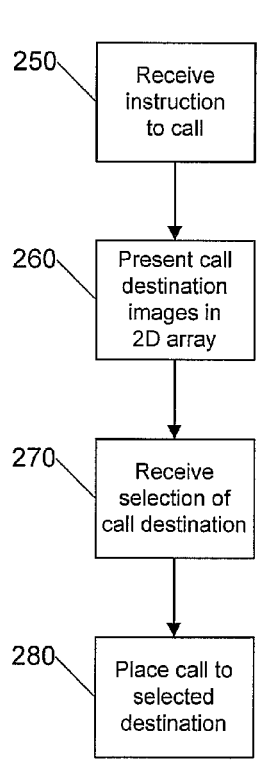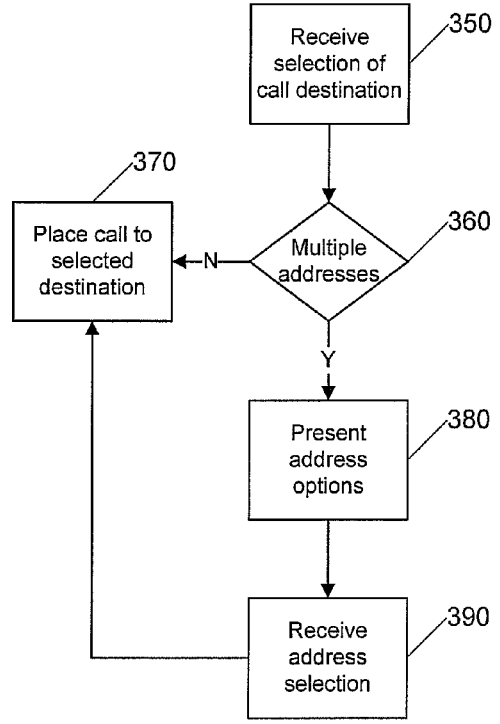
FIG. 1
FIG. 2
FIG. 3
FIG. 4

US 8,331,924 B1

PHONE CALL BY PICTURE SELECTION

FIELD OF THE INVENTION

The present invention generally relates to wired and wireless communication devices and more particularly relates to initialization of calls from a two dimensional array potential call destinations on the user interface.

BACKGROUND

Conventional mobile phone devices allow a user to select a call destination (what contact) to place a call to from a phone book by searching and selecting from a list of contact names. However, when the number of contact entries in the phone book on the mobile phone become too large, it becomes very difficult for the user to find the desired number. To combat this difficulty, conventional mobile phone devices may allow the user to place the most frequent contacts or numbers at the front of the list to help. Even this capability, however, has serious limitation and the user experience remains hampered and limited by searching and selecting from a list of contact names.

SUMMARY

A wireless communication device is configured to respond to a call initiation instruction from a user with a two-dimensional array of pictures or diagrams that represent potential call destinations. The wireless communication device allows the user to scroll (left, right, up, down) to select the image representing the desired call destination. The wireless communication device receives the selection from the user and then places a call (voice or data) to the selected call destination or allows editing of the corresponding contact record. The pictures or diagrams presented to the user may be obtained from a dynamic (e.g., most frequent contacts) or persistent (e.g., favorites) predetermined list that is stored in memory. The name and/or number of the potential call destinations in the two dimensional array may be displayed with the image. A default image (picture or graphic) may be displayed if no picture is associated with the contact. Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which:

FIG. 1 is a network diagram illustrating an example wireless communication device capable of communication over a wireless wide area network ("WWAN") and a wireless local area network ("WLAN") according to an embodiment of the present invention;

FIG. 2 is a block diagram illustrating an example wireless communication device according to an embodiment of the present invention;

FIG. 3 is a flow diagram illustrating an example process for initiating a phone call by picture selection according to an embodiment of the present invention;

FIG. 4 is a flow diagram illustrating an example process for initiating a phone call to one of a plurality of addresses for a call destination according to an embodiment of the present invention;

DETAILED DESCRIPTION

Figure 5:
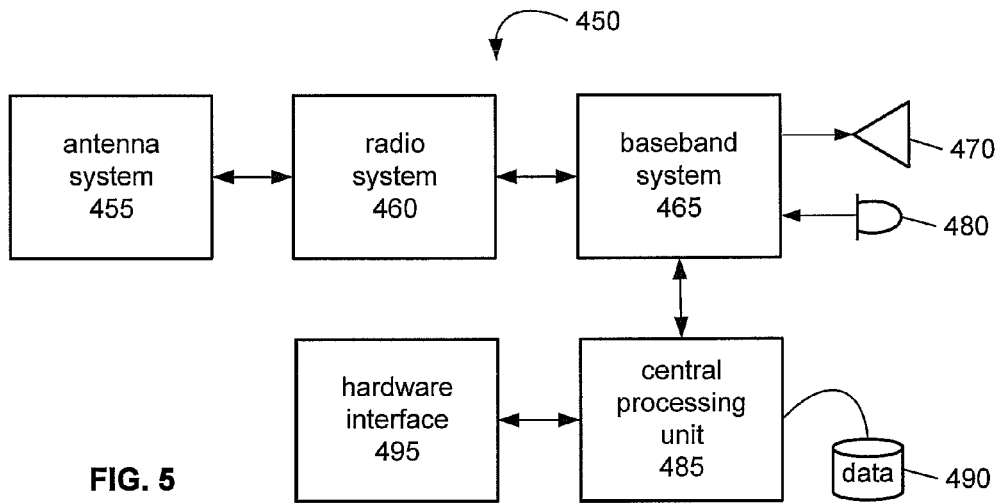
FIG. 5 is a block diagram illustrating an example wireless communication device that may be used in connection with various embodiments described herein.

Certain embodiments as disclosed herein provide for initiating a phone call on a wireless communication device (referred to herein as a "handset") by picture selection. After reading this description it will become apparent to one skilled in the art how to implement the invention in various alternative embodiments and alternative applications. However, although various embodiments of the present invention are described herein, it is understood that these embodiments are presented by way of example only, and not limitation. As such, this detailed description of various alternative embodiments should not be construed to limit the scope or breadth of the present invention as set forth in the appended claims.

FIG. 1 is a network diagram illustrating an example handset capable of communication over a wireless wide area network ("WWAN") and a wireless local area network ("WLAN") according to an embodiment of the present invention. In the illustrated embodiment, the system 10 comprises a dual mode handset 20, a WWAN 30, a WLAN 50, and a two network devices 40 and 60, respectively. The handset 20 is configured with data storage area 25.

The handset 20 is communicatively coupled with both the WWAN 30 and the WLAN 50. The WWAN 30 is configured for voice and data communications (e.g., with device 40) over a wide geographical area, for example using the code division multiple access ("CDMA") communication scheme. The WLAN 50 is configured for voice and data communications (e.g., with device 60) over a more limited geographical area, for example using one or more of the IEEE 802 communication standards such as 802.11 a/b/g. The WWAN 30 or the WLAN 50 can also be communicatively coupled with a public or private network (not shown), which may include that particular aggregation of networks commonly known as the Internet.

The handset 20 can be any of a variety of wireless communication devices, including a cell phone, personal digital assistant ("PDA"), personal computer ("PC"), laptop computer, PC card, special purpose equipment, or any combination of these and other devices capable of establishing a wireless communication link over a wireless communication network such as WWAN 30 and WLAN 50.

The handset 20 maintains in data storage a plurality of contact records that each include one or more network addresses for its respective contact. Network addresses may include phone numbers, fax numbers, email addresses, instant message addresses, and the like. Additionally each contact record includes one or more fields for storing one or more images that are associated with the respective contact. Default images for contact records not having associated images can be stored elsewhere in data storage to avoid redundant default image storage in multiple contact records. The contact record may also include a custom sound file or a link or pointer to a standard sound file that is associated with the contact record or with a particular network address for the contact record. Similarly, contact record may also include a custom video file or a link or pointer to a standard video file that is associated with the contact record or with a particular network address for the contact record.

The data storage area 25 can be any sort of internal or external memory device and may include both persistent and volatile memories. The function of the data storage area 25 is to maintain data for long term storage and also to provide efficient and fast access to instructions for applications that are executed by the handset 20.

FIG. 2 is a block diagram illustrating an example handset 20 according to an embodiment of the present invention. In the illustrated embodiment, the handset 20 comprises a user interface ("UI") module 150 and a call destination module 160. The UI module 150 is configured to interact with the user and present information on the display of the handset 20 and receive user input. For example, the UI module 150 is responsible for displaying text and graphics on the display of the handset 20 to keep the user informed of the status of the handset 20 and current state.

In one embodiment, the UI module 150 receives information from the call destination module 160 and formats the information into a two dimensional array and presents the array on the display screen of the handset 20. Alternatively, the UI module 150 may receive a communication from the call destination module 160 and then obtain the information from memory 25 and then displaying that information on the display screen of the handset 20. Thus, the UI module 150 can communicate with the call destination module 160 directly or indirectly, e.g., through shared memory or the like.

The UI module 150 is configured to both present information on the display screen of the handset 20 and provide audible information through the speaker(s) of the handset 20. The UI module 150 is also configured to receive user interaction with the handset 20 and provide an indication of user instructions or selections to other modules in the handset 20, for example the call destination module 160. The UI module 150 is also configured to receive information and instructions from other modules of the handset 20 as necessary to carry out its user interface functions.

The call destination module 160 is configured to receive a call initiation instruction and initiate a call over a communication network. A call can be any of a variety of network communications, including a voice call, data call, email, instant message, SMS, EMS, or MMS message, just to name a few. The call initiation instruction may come from a user of the handset 20 (e.g., by voice or keypad) and be first received by the UI module 150 and then provided to the call destination module 160.

In one embodiment, the call destination module 160 receives a call initiation instruction and obtains a list of potential call destinations from volatile or persistent memory. A call initiation instruction can be a press of a keypad or multifunction button on the handset 10, for example, or it could be a voice instruction or other input (e.g., via a touch screen display). The call destination module 160 may obtain the list of potential call destinations from a dynamic or persistent predetermined list that is stored in memory. For example, a dynamic predetermined list of potential call destinations may be obtained from a most frequent contacts list stored in memory on the handset 20 and regularly updated. Similarly, a persistent predetermined list of potential call destinations may be obtained from a favorites contacts list stored in memory on the handset 20 and managed as needed by the user. Other dynamic and persistent subs'ets of the global contacts list may also be employed as a list of potential call destinations.

FIG. 3 is a flow diagram illustrating an example process for initiating a phone call by picture selection according to an embodiment of the present invention. The illustrated process can be carried out by a handset such as previously described with respect to FIG. 2 in a communication network such as that described with respect to FIG. 1. Initially, in step 250 the handset receives an instruction to place a call. The instruction may be a voice instruction or come from interaction with the handset, e.g., by pressing a key on the handset keypad or by touching the screen of the handset or by interacting with a menu system via the user interface on the handset.

Next, in step 260, the handset presents a two dimensional array of potential call destination images on the display of the handset. The images in the array can be obtained from the individual contact records that correspond to the potential call destinations in the list or one or more images may be a default image, icon or graphic. Text or other information may also optionally replace one or more potential call destination images. One advantage of the two dimensional array presentation is that it optimizes the use of the display area for presenting the largest number of potential call destinations to the user. Advantageously, the call destination module 160 may work in cooperation with the UI module 150 in order to present the two dimensional array on the display of the handset 20.

In one embodiment, one or more images in the array may be a video clip from the corresponding contact record or other portion of data storage on the handset. Alternatively, one or more of the images in the array may be a set of still images that are repeatedly displayed one after another to provide an animation effect. The images can be photographs or graphics or icons. Accordingly, one or more images in the array may be animated by using actual video or approximating video with sequential images. For example, four images of a person's head from the front, right, left, and back sides could be displayed in sequence as one image in the array to give the appearance of the person's head rotating around in a circle.

Next, in step 270 the handset receives a selection of a potential call destination from the user. The selection can be provided by voice or touch, for example on a button of the key pad or on the screen of the handset. In one embodiment, the selection can be initially received by the UI module 150 and then provided to the call destination module 160.

In an alternative embodiment, the selection can be separated into two separate actions, namely highlighting and selecting. Advantageously, in such an embodiment when a particular image in the array is highlighted, the animation effects may be initiated, rather than having multiple animations proceeding at the same time. Additionally, a custom sound or audio clip can be played upon highlighting a particular image in the array. This can be done separately or in combination with the animation effect. Thus, upon highlighting a particular image in the array, the image may advantageously come to life with animation and custom sounds (e.g., a voice clip from the individual) that serve to personalize the user interface on the handset.

Finally, the handset places a call to the selected destination in step 280. For example, the call destination module may cause the handset to initial a network call to communication with the call destination using the desired format (voice, fax, email, text message, instant message, SMS, EMS, MMS, or other).

FIG. 4 is a flow diagram illustrating an example process for initiating a phone call to one of a plurality of addresses for a call destination according to an embodiment of the present invention. The illustrated process can be carried out by a handset such as previously described with respect to FIG. 2 in a communication network such as that described with respect to FIG. 1. Initially, in step 350 the handset receives the selection of the desired call destination as previously described with respect to step 270. Next, in step 360 the handset determines whether multiple network addresses are available for the desired call destination. If the desired call destination does not have multiple network addresses, then the handset places the call to the network address for the desired call destination in step 370.

If, however, the handset determines in step 360 that there are multiple network addresses for the desired call destination, e.g., by examining the contact record and identifying more than one network address for the contact, then in step 380 the handset presents the available network address options on the display of the handset so that the user may select the desired network address. In certain cases, selection of the desired network address also determines the type of communication that is desired (e.g., voice, data, email, SMS, instant message, etc.).

In step 390, the handset next receives the address selection from the user (e.g., by voice or touch). Receipt of the address selection, as needed, may also include receipt of a particular type of communication. For example, if a user selects a mobile handset phone number as the desired network address, the communication type could be voice or SMS, for example. In such a case, in step 390, the handset receives both the network address and the type of communication that is desired in order to place the appropriate type of call to the selected destination at the selected address, which takes place in step 370.

FIG. 5 is a block diagram illustrating an example wireless communication device 450 that may be used in connection with various embodiments described herein. For example, the wireless communication device 450 may be used in conjunction with a handset such as previously described with respect to FIG. 1. However, other wireless communication devices and/or architectures may also be used, as will be clear to those skilled in the art.

In the illustrated embodiment, wireless communication device 450 comprises an antenna system 455, a radio system 460, a baseband system 465, a speaker 464, a microphone 470, a central processing unit ("CPU") 485, a data storage area 490, and a hardware interface 495. In the wireless communication device 450, radio frequency ("RF") signals are transmitted and received over the air by the antenna system 455 under the management of the radio system 460.

In one embodiment, the antenna system 455 may comprise one or more antennae and one or more multiplexors (not shown) that perform a switching function to provide the antenna system 455 with transmit and receive signal paths. In the receive path, received RF signals can be coupled from a multiplexor to a low noise amplifier (not shown) that amplifies the received RF signal and sends the amplified signal to the radio system 460.

In alternative embodiments, the radio system 460 may comprise one or more radios that are configured to communication over various frequencies. In one embodiment, the radio system 460 may combine a demodulator (not shown) and modulator (not shown) in one integrated circuit ("IC"). The demodulator and modulator can also be separate components. In the incoming path, the demodulator strips away the RF carrier signal leaving a baseband receive audio signal, which is sent from the radio system 460 to the baseband system 465.

If the received signal contains audio information, then baseband system 465 decodes the signal and converts it to an analog signal. Then the signal is amplified and sent to the speaker 470. The baseband system 465 also receives analog audio signals from the microphone 480. These analog audio signals are converted to digital signals and encoded by the baseband system 465. The baseband system 465 also codes the digital signals for transmission and generates a baseband transmit audio signal that is routed to the modulator portion of the radio system 460. The modulator mixes the baseband transmit audio signal with an RF carrier signal generating an RF transmit signal that is routed to the antenna system and may pass through a power amplifier (not shown). The power amplifier amplifies the RF transmit signal and routes it to the antenna system 455 where the signal is switched to the antenna port for transmission.

The baseband system 465 is also communicatively coupled with the central processing unit 485. The central processing unit 485 has access to a data storage area 490. The central processing unit 485 is preferably configured to execute instructions (i.e., computer programs or software) that can be stored in the data storage area 490. Computer programs can also be received from the baseband processor 465 and stored in the data storage area 490 or executed upon receipt. Such computer programs, when executed, enable the wireless communication device 450 to perform the various functions of the present invention as previously described. For example, data storage area 490 may include various software modules (not shown) that were previously described with respect to FIG. 2.

In this description, the term "computer readable medium" is used to refer to any media used to provide executable instructions (e.g., software and computer programs) to the wireless communication device 450 for execution by the central processing unit 485. Examples of these media include the data storage area 490, microphone 470 (via the baseband system 465), antenna system 455 (also via the baseband system 465), and hardware interface 495. These computer readable mediums are means for providing executable code, programming instructions, and software to the wireless communication device 450. The executable code, programming instructions, and software, when executed by the central processing unit 485, preferably cause the central processing unit 485 to perform the inventive features and functions previously described herein.

The central processing unit 485 is also preferably configured to receive notifications from the hardware interface 495 when new devices are detected by the hardware interface. Hardware interface 495 can be a combination electromechanical detector with controlling software that communicates with the CPU 485 and interacts with new devices. The hardware interface 495 may be a firewire port, a USB port, a Bluetooth or infrared wireless unit, or any of a variety of wired or wireless access mechanisms. Examples of hardware that may be linked with the device 450 include data storage devices, computing devices, headphones, microphones, and the like.

Figure 6:
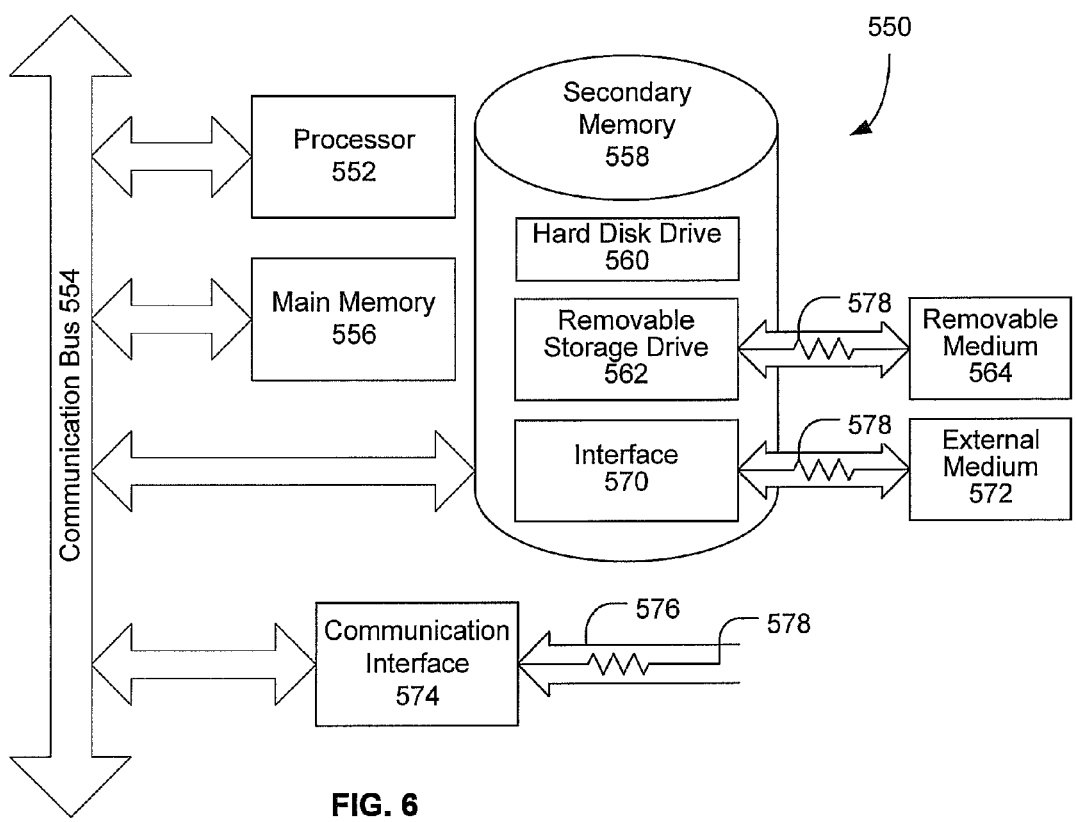
FIG. 6 is a block diagram illustrating an example computer system that may be used in connection with various embodiments described herein.

FIG. 6 is a block diagram illustrating an example computer system 550 that may be used in connection with various embodiments described herein. For example, the computer system 550 may be used in conjunction with a handset or device such as previously described with respect to FIG. 1. However, other computer systems and/or architectures may be used, as will be clear to those skilled in the art.

The computer system 550 preferably includes one or more processors, such as processor 552. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 552.

The processor 552 is preferably connected to a communication bus 554. The communication bus 554 may include a data channel for facilitating information transfer between storage and other peripheral components of the computer system 550. The communication bus 554 further may provide a set of signals used for communication with the processor 552, including a data bus, address bus, and control bus (not shown). The communication bus 554 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

Computer system 550 preferably includes a main memory 556 and may also include a secondary memory 558. The main memory 556 provides storage of instructions and data for programs executing on the processor 552. The main memory 556 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 558 may optionally include a hard disk drive 560 and/or a removable storage drive 562, for example a floppy disk drive, a magnetic tape drive, a compact disc ("CD") drive, a digital versatile disc ("DVD") drive, etc. The removable storage drive 562 reads from and/or writes to a removable storage medium 564 in a well-known manner. Removable storage medium 564 may be, for example, a floppy disk, magnetic tape, CD, DVD, etc.

The removable storage medium 564 is preferably a computer readable medium having stored thereon computer executable code (i.e., software) and/or data. The computer software or data stored on the removable storage medium 564 is read into the computer system 550 as electrical communication signals 578.

In alternative embodiments, secondary memory 558 may include other similar means for allowing computer programs or other data or instructions to be loaded into the computer system 550. Such means may include, for example, an external storage medium 572 and an interface 570. Examples of external storage medium 572 may include an external hard disk drive or an external optical drive, or and external magneto-optical drive.

Other examples of secondary memory 558 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage units 572 and interfaces 570, which allow software and data to be transferred from the removable storage unit 572 to the computer system 550.

Computer system 550 may also include a communication interface 574. The communication interface 574 allows software and data to be transferred between computer system 550 and external devices (e.g. printers), networks, or information sources. For example, computer software or executable code may be transferred to computer system 550 from a network server via communication interface 574. Examples of communication interface 574 include a modem, a network interface card ("NIC"), a communications port, a PCMCIA slot and card, an infrared interface, and an IEEE 1394 fire-wire, just to name a few.

Communication interface 574 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 574 are generally in the form of electrical communication signals 578. These signals 578 are preferably provided to communication interface 574 via a communication channel 576. Communication channel 576 carries signals 578 and can be implemented using a variety of wired or wireless communication means including wire or cable, fiber optics, conventional phone line, cellular phone link, wireless data communication link, radio frequency (RF) link, or infrared link, just to name a few.

Computer executable code (i.e., computer programs or software) is stored in the main memory 556 and/or the secondary memory 558. Computer programs can also be received via communication interface 574 and stored in the main memory 556 and/or the secondary memory 558. Such computer programs, when executed, enable the computer system 550 to perform the various functions of the present invention as previously described.

In this description, the term "computer readable medium" is used to refer to any media used to provide computer executable code (e.g., software and computer programs) to the computer system 550. Examples of these media include main memory 556, secondary memory 558 (including hard disk drive 560, removable storage medium 564, and external storage medium 572), and any peripheral device communicatively coupled with communication interface 574 (including a network information server or other network device). These computer readable mediums are means for providing executable code, programming instructions, and software to the computer system 550.

In an embodiment that is implemented using software, the software may be stored on a computer readable medium and loaded into computer system 550 by way of removable storage drive 562, interface 570, or communication interface 574. In such an embodiment, the software is loaded into the computer system 550 in the form of electrical communication signals 578. The software, when executed by the processor 552, preferably causes the processor 552 to perform the inventive features and functions previously described herein.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

What is claimed is:

1. A wireless communication device including a microprocessor, a persistent storage area, a volatile storage area, and a communication means, the wireless communication device configured to provide call destination selection by media selection, the wireless communication device comprising:
    a call destination module configured to receive a call initiation instruction and obtain a set of potential call destinations from the persistent storage area or the volatile storage area and provide said set of potential call destinations for display on the wireless communication device, wherein the set of potential call destinations comprises a set of most frequently called potential call destinations;
    a user interface module configured to obtain the set of potential call destinations and create a two dimensional array of custom media files, wherein each custom media file corresponds to one potential call destination, and present said custom media files on the display of the wireless communication device, wherein a first custom media file comprises at least two images and a second custom media file comprises at least one image and sound;
    wherein the call destination module is further configured to receive a potential call destination selection and identify a plurality of addresses comprising at least one of an email address and an instant message address and corresponding to the selected call destination and provide said plurality of addresses to the user interface module for presentation on the display of the wireless communication device and receive a selection of a call destination address and initiate a call to the selected call destination address;
    wherein the user interface module is further configured to initiate an animation effect and play a sound associated with a call destination address when the custom media file associated with the call destination address is selected and comprises a video file including at least two images and sound; wherein selection of the call destination address causes retrieval of the custom media file stored elsewhere in a data storage area to avoid redundant storage.

2. The wireless communication device of claim 1, wherein the call destination module is further configured to receive the potential call destination selection from the user interface module.

3. The wireless communication device of claim 1, wherein the user interface module is further configured to present the plurality of addresses on the display of the wireless communication device in a two dimensional array of address custom media files.

4. The wireless communication device of claim 3, wherein each custom media file in the two dimensional array of address custom media files corresponds to one address.

5. The wireless communication device of claim 4, wherein an address comprises one of a phone number, an email address, or an instant message address.

6. A computer implemented method used by a wireless communication device for call destination selection by media selection, comprising:
    receiving an instruction for initiating a network call;
    obtaining a list of potential call destinations, wherein each potential call destination has a corresponding contact record in an accessible data storage area, wherein a contact record comprises one or more fields for storing one of an associated custom media file and a link to an associated custom media file stored elsewhere in a data storage area to avoid redundant storage, wherein the set of potential call destinations comprises a set of most frequently called potential call destinations;
    creating a two dimensional array of custom media files corresponding to the list of potential call destinations, wherein the array of custom media files comprises at least one contact record custom media file, wherein a first custom media file comprises at least two images and a second custom media file comprises at least one image and sound;

presenting the two dimensional array of custom media files on a display viewable by a user;

receiving a selection of a call destination, said selection based on a user interaction with the two dimensional array of custom media files;

identifying a plurality of addresses for the selected call destination comprising at least one of an email address and an instant message address;

presenting the plurality of addresses for the selected call destination;

receiving a selection of a desired call destination address;

placing a call to the desired call destination address; and initiating an animation effect and playing a sound associated with a call destination address when the custom media file associated with the call destination address is selected and comprises a video file including at least two images and sound;

wherein selection of the call destination address causes retrieval of the custom media file stored elsewhere in a data storage area to avoid redundant storage.

7. The method of claim 6, wherein the call is one of a voice call or a data call.

8. The method of claim 6, wherein the call is one of an email message, an sms message, a meeting invitation, or an instant message.

9. The method of claim 6, wherein the desired call destination address is one of an email address, a phone number, or an instant message address.

10. The method of claim 6, wherein at least one custom media file in the two dimensional array of custom media files further comprises a plurality of images and the presenting step further comprises sequentially displaying the plurality of images in a single location in the two dimensional array of custom media files.

11. The method of claim 6, wherein a user interaction comprises highlighting one of the custom media files in the two dimensional array of custom media files.

12. The method of claim 11, further comprising playing an audible sound when a custom media file in the two dimensional array of custom media files is highlighted.

13. A wireless communication device including a microprocessor, a persistent storage area, a volatile storage area, and a communication means, the wireless communication device configured to provide call destination selection by media selection, the wireless communication device comprising:

a call destination module configured to receive a call initiation instruction and obtain a set of potential call destinations from the persistent storage area or the volatile storage area and provide said set of potential call destinations for display on the wireless communication device; and a user interface module configured to obtain the set of potential call destinations and create a two dimensional array of one of custom media files and links to custom media files stored elsewhere in a data storage area to avoid redundant storage, wherein each image custom media file corresponds to one potential call destination, and present said custom media files or said links on the display of the wireless communication device, wherein the call destination module is further configured to receive a call destination selection from the user interface module and identify a plurality of call destination addresses corresponding to the selected call destination and provide said plurality of call destination addresses to the user interface module for presentation on the display of the wireless communication device;

wherein the user interface module is further configured to receive the plurality of call destination addresses and create a two dimensional array of custom media files, wherein each custom media file corresponds to one call destination address and wherein a first custom media file associated with the call destination address comprises at least two images and a second custom media file associated with the call destination address comprises at least one image and sound, the user interface module further configured to present said custom media files on the display of the wireless communication device;

wherein the user interface module is also configured to obtain an animation effect and play a sound associated with at least one of the plurality of call destination addresses, the user interface module being configured to initiate the animation effect and play the sound associated with the call destination address when the custom media file associated with the call destination address is highlighted and comprises a video file including at least two picture images and a sound;

wherein the call destination module is further configured to receive a selection of a call destination address and initiate a call to one of an email address or an instant message address associated with the selected call destination address.

14. The device of claim 13, wherein the user interface module is also configured to obtain an animation effect associated with at least one of the potential call destinations, the user interface module being configured to initiate an animation effect associated with a call destination when the custom media file associated with the call destination is highlighted and comprises at least two images.

15. The device of claim 13, wherein a first custom media file associated with the call destination comprises at least two images and a second custom media file associated with the call destination comprises at least one image and sound.

* * * * *